United States Patent
Fang et al.

(10) Patent No.: US 11,455,530 B2
(45) Date of Patent: Sep. 27, 2022

(54) CONTROLLING AGENTS USING SCENE MEMORY DATA

(71) Applicant: Google LLC, Mountain View, CA (US)

(72) Inventors: Kuan Fang, Stanford, CA (US); Alexander Toshkov Toshev, San Francisco, CA (US)

(73) Assignee: Google LLC, Mountain View, CA (US)

( * ) Notice: Subject to any disclaimer, the term of this patent is extended or adjusted under 35 U.S.C. 154(b) by 482 days.

(21) Appl. No.: 16/602,702

(22) Filed: Nov. 20, 2019

(65) Prior Publication Data

US 2020/0160172 A1 May 21, 2020

Related U.S. Application Data

(60) Provisional application No. 62/770,114, filed on Nov. 20, 2018.

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC ........ G06N 3/08; G06N 3/0454; G06N 3/088; G06N 7/005; G06N 3/006; G06N 3/04; G06N 3/0445; G06N 3/084; G06N 3/0472; G06N 20/00; G05B 2219/33025
See application file for complete search history.

(56) References Cited

U.S. PATENT DOCUMENTS

| | | | |
|---|---|---|---|
| 2019/0266475 A1* | 8/2019 | Wierstra | G06N 3/006 |
| 2019/0303764 A1* | 10/2019 | Uria-Martmez | G06N 3/006 |
| 2019/0324988 A1* | 10/2019 | Wayne | G06N 3/0472 |
| 2019/0340509 A1* | 11/2019 | Osindero | G06N 3/04 |

OTHER PUBLICATIONS

Anderson et al., "Vision-and-Language Navigation: Interpreting visually-grounded navigation instructions in real environments", Proceedings of the IEEE Conference Vision and Pattern Recognition (CVPR), 2018, 10 pages.
Bonin-Font et al., "Visual Navigation for Mobile Roots: a Survey", Journal of Intelligent and Robotic Systems, 2008, 53:263-296.
(Continued)

*Primary Examiner* — Yogeshkumar Patel
(74) *Attorney, Agent, or Firm* — Fish & Richardson P.C.

(57) ABSTRACT

Methods, systems, and apparatus, including computer programs encoded on computer storage media, for controlling an agent. One of the methods includes receiving a current observation characterizing a current state of the environment as of the time step; generating an embedding of the current observation; processing scene memory data comprising embeddings of prior observations received at prior time steps using an encoder neural network, wherein the encoder neural network is configured to apply an encoder self-attention mechanism to the scene memory data to generate an encoded representation of the scene memory data; processing the encoded representation of the scene memory data and the embedding of the current observation using a decoder neural network to generate an action selection output; and causing the agent to perform the selected action.

20 Claims, 3 Drawing Sheets

(56) References Cited

OTHER PUBLICATIONS

Chaplot et al., "Active Neural Localization", arXiv:1801.08214, Jan. 2018, 15 pages.
Davison et al., "Real-Time Simultaneous Localisation and Mapping with a Single Camera", IEEE, 2003, 8 pages.
Dayoub et al., "Vision-only autonomous navigation using topometric maps", Proceedings of the 2013 IEEE/RSJ International Conference on Intelligent Robots and Systems, 2013, pp. 1923-1929.
DeSouza et al., "Vision for mobile robot navigation: a survey", IEEE Transactions on Pattern Analysis and Machine Intelligence, 2002, 24(2):237-267.
Eslami et al., "Neural Scene Representation and Rendering", Science, 2018, 360:1204-1210.
Galceran et al., "A survey on coverage path planning for robotics", Robotics and Autonomous Systems, 2013, 61(12):1258-1276.
Gordon et al., "IQA: Visual Question Answering in Interactive Environments", arXiv:1712.03316, 2017, 10 pages.
Graves et al., "Hybrid computing using a neural network with dynamic external memory", Nature, 2016, 538(7626):471-491.
Gupta et al., "Cognitive Mapping and Planning for Visual Navigation", IEE Conference on Computer Vision and Pattern Recognition (CVPR), 2017, pp. 7272-7281.
Gupta et al., "Unifying Map and Landmark Based Representations for Visual Navigation", arXiv:1712.08125v1, Dec. 2017, 10 pages.
He et al., "Deep Residual Learning for Image Recognition", IEEE Conference on Computer Vision and Pattern Recognition, 2016, pp. 770-778.
Henriques et al., "MapNet: An Allocentric Spatial Memory for Mapping Environments", Proceedings of the IEEE Conference on Computer Vision and Pattern Recognition, 2018, pp. 8476-8484.
Hochreiter et al., "Long Short-Term Memory", Neural Computation, 1997, 9(8):1735-1780.
Jaderberg et al., "Reinforcement Learning with Unsupervised Auxiliary Tasks", arXiv:1611.05397v1, Nov. 2016, 14 pages.
Kempka et al., "ViZDoom: A Doom based AI Research Platform for Visual Reinforcement Learning" arXiv:1605.02097v2, Sep. 2016, 8 pages.
Khan et al., "Memory Augmented Control Networks", arXiv:1709.05706v6, Feb. 2018, 19 pages.
Lee et al., Set Transformer: A Framework for Attention-based Permutation-Invariant Neural Networks:, arXiv:1810.00825v3, May 2019, 17 pages.
Liu et al., "Generating Wikipedia by Summarizing Long Sequences", arXiv:1801.10198v1, Jan. 2018, 18 pages.
Mirowski et al., "Learning to Navigate in Complex Environments", arXiv:1611.03673v3, Jan. 2017, 16 pages.
Mnih et al., "Asynchronous Methods for Deep Reinforcement Learning", International Conference on Machine Learning, 2016, pp. 1928-1937.
Mnih et al., "Human-level control through deep reinforcement learning", Nature, 2015, 518:529-533.
Mousavian et al., "Visual Representations for Semantic Target Driven Navigation", arXiv:1805.06066v3, Jul. 2019, 7 pages.
Oh et al., "Control of Memory, Active Perception, and Action in Minecraft", arXiv:1605.09128v1, May 2016, 22 pages.
Parisotto et al., "Neural Map: Structured Memory for Deep Reinforcement Learning", arXiv:172.08360v1, Feb. 2017, 13 pages.
Pascanu et al., "On the difficulty of training recurrent neural networks", International Conference on Machine Learning, 2013, 9 pages.
Pathak et al., "Curiosity-driven Exploration by Self-Supervised Prediction", Proceedings of the IEEE Conference on Computer Vision and Pattern Recognition Workshops, 2017, pp. 16-17.
Qi, Charles Ruizhongtai, et al. "Pointnet++: Deep hierarchical feature learning on point sets in a metric space." Advances in Neural Information Processing Systems, 2017, 10 pages.
Savinov et al., "Semi-Parametric Topological Memory for Navigation", arXiv:1803.00653v1, Mar. 2018, 16 pages.
Sim et al., "Autonomous vision-based exploration and mapping using hybrid maps and Rai-Blackwellised particle filters", IEEE/RSJ International Conference on Intelligent Robots and Systems, 2006, 8 pages.
Song et al., "Semantic Scene Completion from a Single Depth Image", IEEE Conference on Computer Vision and Pattern Recognition, 2017, 9 pages.
Sukhbaatar et al., "End to End Memory Networks", Advances in Neural Information Processing Systems, 2015, 9 pages.
Thrun., "Simultaneous Localization and Mapping", Springer Tracts in Advanced Robotics, 2007, pp. 13-41.
Tomono., "3D Object Map Building Using Dense Object Models with SIFT based Recognition Features", International Conference on Intelligent Robots and Systems, 2006, pp. 1885-1890.
Trinh et al., "Learning longer term dependencies in RNNs with Auxiliary Losses", arXiv:1803.00144v3, Jun. 2018, 11 pages.
Vaswani et al., "Attention is all you need", Advances in Neural Information Processing Systems, 2017, 11 pages.
Wierstra et al., "Recurrent Policy Gradients", Logic Journal of IGPL, 2010, 18:620-634.
Wooden., "A Guide to Vision-Based Map Building", IEEE Robotics & Automation Magazine, 2006, 13:94-98.
Wu et al., "Building Generalizable Agents with a Realistic and Rich 3D Environment", arXiv:1801.02209v2, Apr. 2018, 15 pages.
Xia et al., "Gibson Env: Real World Perception for Embodied Agents", Proceedings of the IEEE Conference on Computer Vision and Pattern Recognition, 2018, pp. 9068-9079.
Zhang et al., "Neural SLAM: Learning to Explore with External Memory", arXiv:1706.09520v6, Nov. 2017, 8 pages.
Zhang et al., "Learning Deep Neural Policies with Continuous Memory States", arXiv:1507.01273v2, Sep. 2015, 8 pages.
Zhu et al., "Visual Semantic Planning using Deep Successor Representations", IEEE International Conference on Computer Vision, 2017, pp. 483-492.
Zhu et al., "Target-driven Visual Navigation in Indoor Scenes using Deep Reinforcement Learning" IEEE International Conference on Robotics and Automation, 2017, pp. 3357-3364.

* cited by examiner

CONTROLLING AGENTS USING SCENE MEMORY DATA

CROSS-REFERENCE TO RELATED APPLICATION

This application claims priority to U.S. Provisional Application No. 62/770,114, filed on Nov. 20, 2018. The disclosure of the prior application is considered part of and is incorporated by reference in the disclosure of this application.

BACKGROUND

This specification relates to reinforcement learning.

In a control system, an agent interacts with an environment by performing actions that are selected by the control system in response to receiving observations that characterize the current state of the environment.

Some control systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a control system that controls an agent interacting with an environment using a scene memory that stores embeddings of prior observations characterizing prior states of the environment.

Particular embodiments of the subject matter described in this specification can be implemented so as to realize one or more of the following advantages.

Many complex tasks, e.g., robotic tasks, require the agent to perform tasks over a long time horizon, i.e., over a large number of time steps, and in large environments. In such applications, decision making at any time step can depend on states observed far in the past. Hence, being able to properly capture past observations is crucial to achieving good performance on the task.

The described systems maintain embeddings of prior observations and use an attention mechanism to attend over those maintained embeddings at each time step to generate an encoded memory. The systems then use an embedding of the current observation as a query to attend to the encoded memory to generate an action selection output at the time step. This allows the described systems to effectively capture long term dependencies and learn a relevant geometry of the environment. In particular, the described systems can learn to prioritize particular observations at any given time step without requiring any pre-determined structure of the environment to be known in advance.

Additionally, although the scene memory grows linearly with the length of a task episode, the memory stores only an embedding vector at each time step, i.e., instead of the entire observation. Therefore, the memory can be maintained without excessive computational overhead and data representing a large number of observations can be stored without excessive burden on modern-day computer hardware.

Moreover, the computational complexity of attending over the memory can be reduced to linear using memory factorization, further reducing the computational overhead required to maintain and attend to the memory.

Thus, the described systems allow an agent to achieve improved results relative to conventional systems on complex tasks that require the agent to perform tasks over a long time horizon and in large environments, e.g., navigation tasks or exploration tasks.

Some existing systems attempt to account for long-term dependencies using recurrent neural networks. However, recurrent neural networks (RNNs) can have difficulties capturing very long-term dependencies. Additionally, RNNs must be trained through backpropagation through time (BPTT) while the described systems use neural networks that are attention-based and do not include any recurrence. By not requiring BPTT during training, the optimization of the described neural networks is more stable and less computationally heavy. This allows for training with longer episodes, which is of advantage for tasks with long time horizons. Thus, the described systems perform better while requiring fewer computational resources to train than RNN or other memory based approaches.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
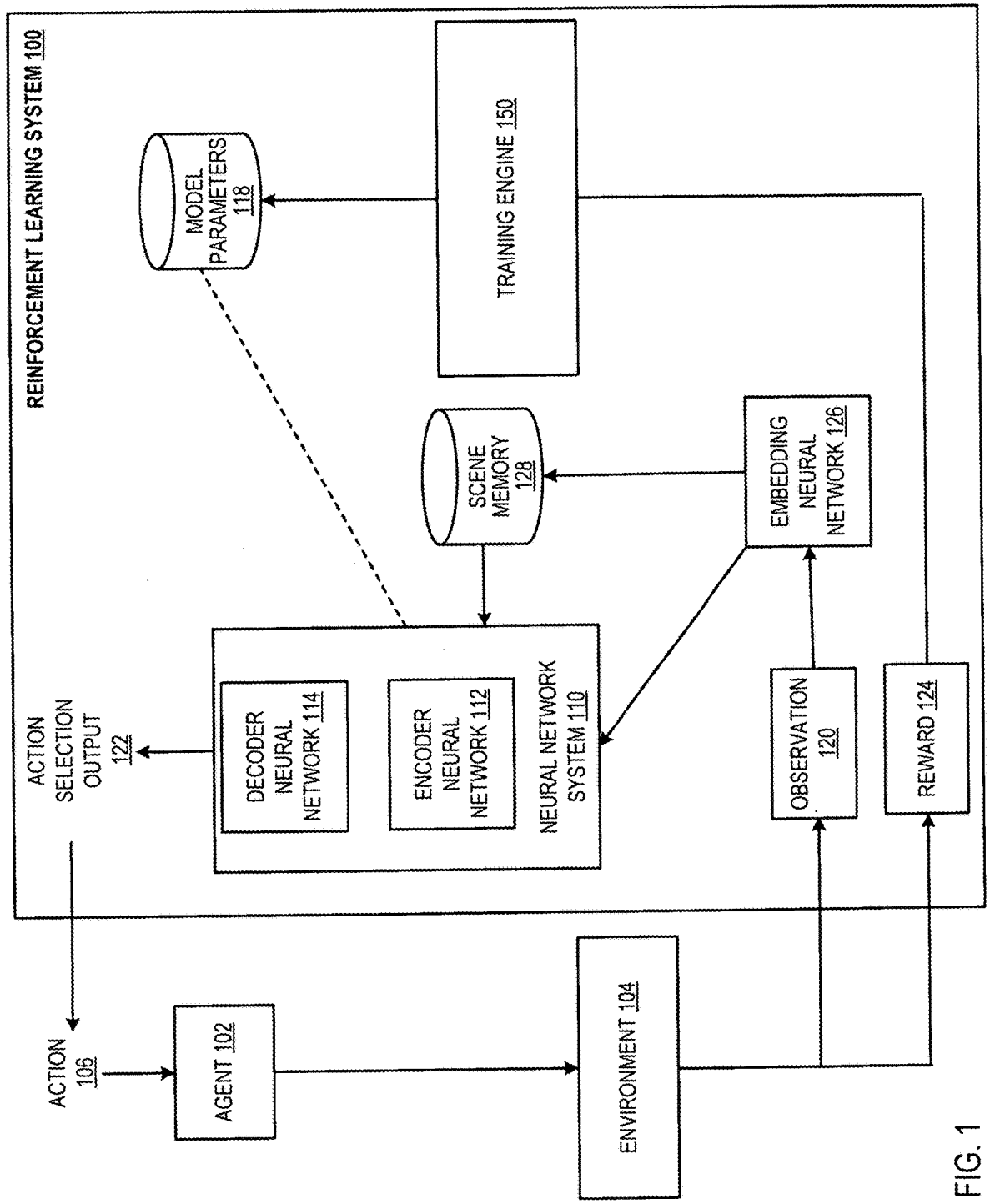
FIG. 1 shows an example control system.

This specification describes a control system that controls an agent interacting with an environment by, at each of multiple time steps, processing data characterizing the current state of the environment at the time step (i.e., an "observation") to select an action to be performed by the agent.

At each time step, the state of the environment at the time step depends on the state of the environment at the previous time step and the action performed by the agent at the previous time step.

In some implementations, the environment is a real-world environment and the agent is a mechanical agent interacting with the real-world environment, e.g., a robot or an autonomous or semi-autonomous land, air, or sea vehicle navigating through the environment.

In these implementations, the observations may include, e.g., one or more of: images, object position data, and sensor data to capture observations as the agent interacts with the environment, for example sensor data from an image, distance, or position sensor or from an actuator.

For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g., steering, and movement e.g., braking and/or acceleration of the vehicle.

In the case of an electronic agent the observations may include data from one or more sensors monitoring part of a plant or service facility such as current, voltage, power, temperature and other sensors and/or electronic signals representing the functioning of electronic and/or mechanical items of equipment. For example the real-world environment may be a manufacturing plant or service facility, the observations may relate to operation of the plant or facility, for example to resource usage such as power consumption, and the agent may control actions or operations in the plant/facility, for example to reduce resource usage. In some other implementations the real-world environment may be a renewal energy plant, the observations may relate to operation of the plant, for example to maximize present or future plumed electrical power generation, and the agent may control actions or operations in the plant to achieve this.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g., to adjust or turn on/off components of the plant/facility.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/intermediates/precursors and/or may be derived from simulation.

In some implementations the environment may be a simulated environment and the agent may be implemented as one or more computers interacting with the simulated environment.

The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In some implementations, the simulated environment may be a simulation of a particular real-world environment. For example, the system may be used to select actions in the simulated environment during training or evaluation of the control neural network and, after training or evaluation or both are complete, may be deployed for controlling a real-world agent in the real-world environment that is simulated by the simulated environment. This can avoid unnecessary wear and tear on and damage to the real-world environment or real-world agent and can allow the control neural network to be trained and evaluated on situations that occur rarely or are difficult to re-create in the real-world environment.

Generally, in the case of a simulated environment, the observations may include simulated versions of one or more of the previously described observations or types of observations and the actions may include simulated versions of one or more of the previously described actions or types of actions.

Optionally, in any of the above implementations, the observation at any given time step may include data from a previous time step that may be beneficial in characterizing the environment, e.g., the action performed at the previous time step, the reward received at the previous time step, and so on.

FIG. 1 shows an example control system 100. The control system 100 is an example of a system implemented as computer programs on one or more computers in one or more locations in which the systems, components, and techniques described below are implemented.

The system 100 controls an agent 102 interacting with an environment 104 by selecting actions 106 to be performed by the agent 102 and then causing the agent 102 to perform the selected actions 106.

Performance of the selected actions 106 by the agent 102 generally causes the environment 104 to transition into new states. By repeatedly causing the agent 102 to act in the environment 104, the system 100 can control the agent 102 to complete a specified task.

The system 100 includes a control neural network system 110, an embedding neural network 126, one or more memories storing scene memory data 128, a training engine 150, and one or more memories storing a set of model parameters 118 of the control neural network system 110 and the embedding neural network 126.

At each of multiple time steps, the control neural network system 110 is configured to process an input that includes data derived from the current observation 120 characterizing the current state of the environment 104 in accordance with the model parameters 118 to generate an action selection output 122.

The system 100 uses the action selection output 122 to control the agent, i.e., to select the action 106 to be performed by the agent at the current time step in accordance with an action selection policy and then cause the agent to perform the action 106, e.g., by directly transmitting control signals to the agent or by transmitting data identifying the action 106 to a control system for the agent.

A few examples of using the action selection output 122 to select the action 106 to be performed by the agent are described next.

In one example, the action selection output 122 defines a probability distribution over possible actions to be performed by the agent. For example, the action selection output can include a respective action probability for each action in a set of possible actions that can be performed by the agent to interact with the environment. In another example, the action selection output 122 can include parameters of a distribution over the set of possible actions. The system 100 can select the action to be performed by the agent based on the action selection output 122 using any of a variety of action selection policies, e.g., by sampling an action in accordance with the probability values for the actions, or by selecting the action with the highest probability value.

In another example, the action selection output 122 identifies an optimal action from the set of possible actions to be performed by the agent in response to the observation. For example, in the case of controlling a mechanical agent, the action selection output can identify torques to be applied to one or more joints of the mechanical agent. The system 100 can select the action to be performed by the agent based on the action selection output 122 using any of a variety of action selection policies, e.g., by selecting the identified optimal action or by adding noise to the optimal action to encourage exploration and selecting the noise-added action.

In another example, the action selection output 122 may include a respective Q-value for each action in the set of possible actions that can be performed by the agent.

The Q value for an action is an estimate of a "return" that would result from the agent performing the action in response to the current observation 120 and thereafter selecting future actions performed by the agent 102 in accordance with current values of the control neural network parameters.

A return refers to a cumulative measure of "rewards" 124 received by the agent, for example, a time-discounted sum of rewards.

The agent can receive a respective reward 124 at each time step, where the reward 124 is specified by a scalar numerical value and characterizes, e.g., a progress of the agent towards completing a specified task.

In this example, the system 100 can select the action to be performed by the agent based on the action selection output 122 using any of a variety of action selection policies, e.g., by selecting the action with the highest Q value or by mapping the Q values to probabilities and sampling an action in accordance with the probabilities.

In some cases, the system 100 can select the action to be performed by the agent in accordance with an exploration policy. For example, the exploration policy may be an $\varepsilon$-greedy exploration policy, where the system 100 selects the action to be performed by the agent in accordance with the action selection output 122 with probability 1-$\varepsilon$, and randomly selects the action with probability $\varepsilon$. In this example, $\varepsilon$ is a scalar value between 0 and 1.

In more detail, to allow the system 100 to effectively control the agent 102, the system maintains the scene memory data 128.

The scene memory data 128 includes embeddings of prior observations received at prior time steps. An embedding is an ordered collection of numeric values, e.g., a vector or a matrix of floating-point, fixed point, or other numeric values.

When a new observation 120 is received, the system 100 processes the observation 120 using the embedding neural network 126.

The neural network system 110 then uses the embedding of the observation 120 and the scene memory data 128 to generate the action selection output 122.

In particular, the neural network system 110 includes an encoder neural network 112 and a decoder neural network 114.

At each time step, the neural network system 110 processes the scene memory data 128 using the encoder neural network 112 to generate an encoded representation of the scene memory data 128.

The encoder neural network 112 is configured to apply an encoder self-attention mechanism to the scene memory data 128 to generate the encoded representation of the scene memory data 128. That is, the encoder neural network attends over the scene memory data 128 to generate the encoded representation.

The neural network system 110 then processes the encoded representation of the scene memory data 128 and the embedding of the current observation 120 using the decoder neural network 114 to generate the action selection output 122.

The decoder neural network 114 includes a decoder attention block that is configured to attend over the encoded representation using a query derived from the embedding of the current observation 120 to generate an initial output and to process the initial output to generate the action selection output 122.

Thus, both the decoder 114 and the encoder 112 use attention mechanisms, i.e., instead of recurrent neural network layers, to incorporate data from prior observations when making a decision about how to control the agent at the current time step.

The system 100 also updates the scene memory data 128 using the embedding of observation 120, i.e., so that actions at future time steps will be conditioned on the embedding of the current observation 120.

In some implementations, the scene memory data processed by the encoder neural network 112 does not include the current observation, i.e., the system 100 generates the encoded representation of the scene memory data using the encoder neural network prior to adding the embedding of the current observation 120 to the scene memory data.

In other implementations, the scene memory data processed by the encoder neural network 112 does include the current observation, i.e., the system 100 adds the embedding of the current observation 120 to the scene memory data and then generates the encoded representation of the scene memory data.

Thus, the scene memory used by the system 100 is simply a set of all embedded observations. Determinations about how this information is aggregated when selecting an action in response to a given observation are made by the encoder and the decoder at the time that the action is selected and the information in the scene memory can therefore be aggregated differently when responding to different observations. This can be particularly useful for long-horizon tasks where the computation of an action at a specific time step could depend on any provided information in the past. This variably and long-term dependencies will likely not be properly captured in a state vector or a map-like memory like those that are employed by conventional systems.

The operations performed by the embedding neural network, the encoder neural network, and the decoder neural network are described in more detail below with reference to FIG. 2.

The training engine 150 is configured to train the control neural network system 110, i.e., the encoder 112 and the decoder 114, by repeatedly updating the model parameters 118 of the control neural network system 110 based on the interactions of the agent with the environment.

In particular, the training engine 150 trains the control neural network system 110 through reinforcement learning using received observations 120 and rewards 124. The training engine 150 can train the control neural network system 110 using any reinforcement learning technique that is appropriate for the type of action selection output that is generated, e.g., a policy gradient technique, an actor-critic technique, or a Q-learning technique.

Generally, the training engine 150 or another system pre-trains the embedding neural network 128 prior to training the control neural network system 110. For example, the training engine 150 can train the embedding neural network 128 using the reinforcement learning technique and in combination with a simplified version of the control neural network system 110 that does not maintain scene memory data 128 and generates action selection outputs using only the embedding of the current observation.

Figure 2:
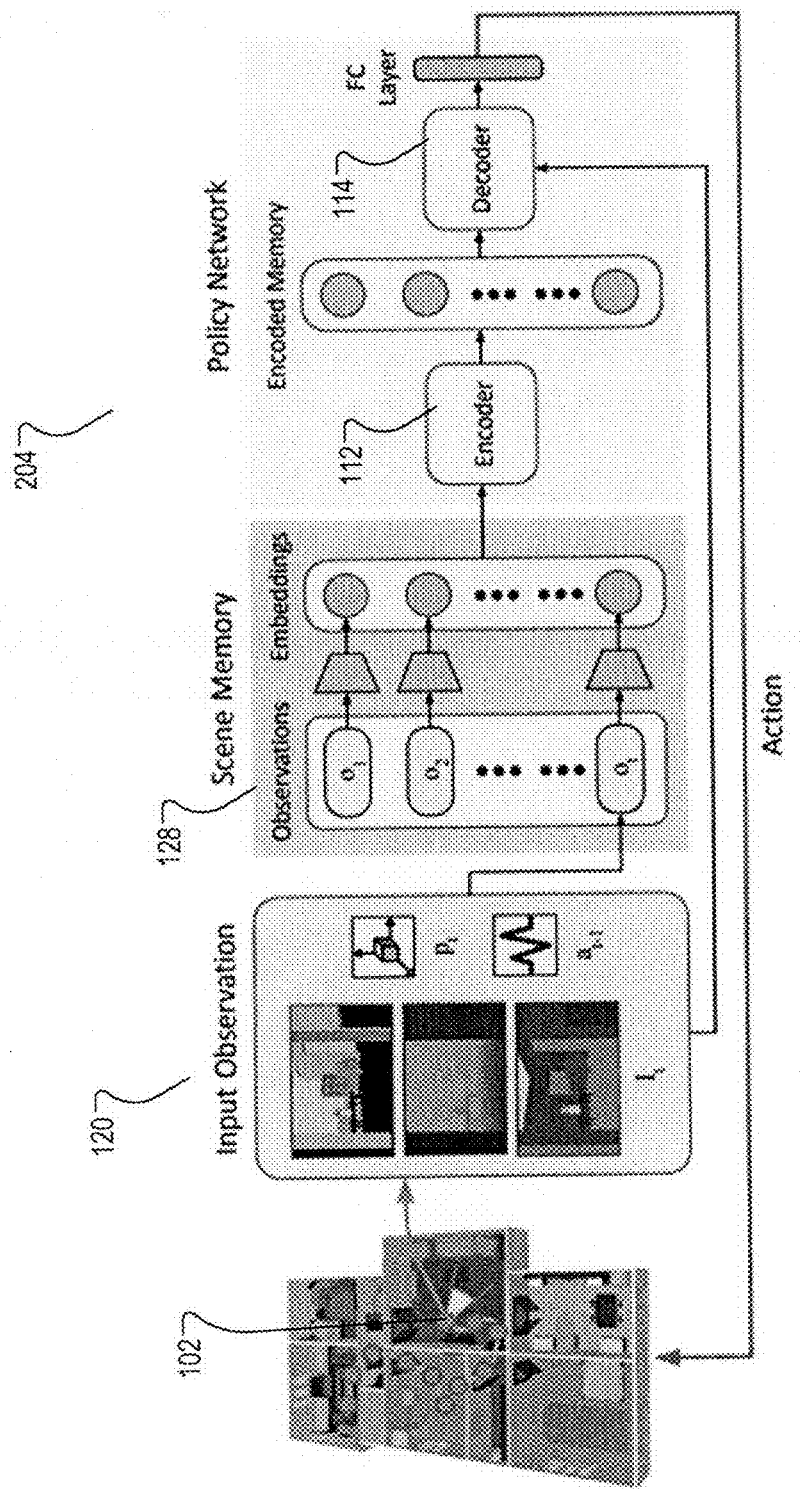
FIG. 2 shows an example of how the system controls the agent at a current time step.

FIG. 2 shows an example of how the system controls the agent at a current time step.

As shown in FIG. 2, the agent 102 is navigating through an indoor environment and, as of the current time step t, has reached a current location in one of the rooms in the indoor environment after navigating through other rooms in the indoor environment at earlier time steps. That is, at the earlier time steps, observations were received characterizing locations in the other rooms of the environment. If the task being performed by the agent is to search for certain objects in the environment, it would be beneficial for the agent to have access to information identifying where the agent has already been and what items were found at those locations. Similarly, if the task being performed by the agent is to maximally explore the environment, e.g., in order to generate a map of a previously unknown environment, it is beneficial for the agent to have access to information identifying where the agent has already visited and what alternative paths the agent could have taken from the already visited locations.

At the current time step, the system needs to select an action to be performed by the agent 102 in response to an input observation 120 that characterize the state of the environment at the current time step, i.e., the agent's location in the environment at the given time step.

In the example of FIG. 2, the observation includes visual data generated from data captured by a camera sensor of the agent. In particular, the observation includes an RGB image, a segmentation mask, and a depth image of the environment obtained from a camera sensor mounted on the agent. In other implementations, the visual data can include only one or two of the above.

The observation also includes the action that was performed at preceding time step t-1 and pose data that estimates the current pose of the agent as of the agent t.

As described above with reference to FIG. 1, the system maintains scene memory data 128 that includes embeddings of the past observations received at earlier time steps and, optionally, an embedding of the current observation received at the current time step.

To generate the scene memory data 128, the system generates an embedding of each past observation that was received at the earlier time steps.

To generate an embedding of a given observation, the system processes the observation using an embedding neural network.

As described above, in some cases, the observations include data from a plurality of modalities, e.g., both images and pose data. In these cases, the embedding neural network generates the embedding of a given observation by processing the data of each modality using one or more neural network layers corresponding to the modality. For example, the system can process the data of each modality using one or more neural network layers corresponding to the modality to generate initial embeddings, concatenate the initial embeddings, and then process the concatenated result through a fully-connected layer to generate the final embedding. For image modalities, the one or more layers can be all of or portions of a convolutional neural network. For non-image modalities, e.g., poses and actions, the one or more layers can be one or more fully-connected layers.

In some implementations, the system embeds each observation as it is received and only needs to store the embedding rather than storing the entire observation, i.e., the system can discard the observation after the embedding is generated.

In some other implementations, the system may need to re-generate part of the embedding for any given past observation when the current observation is received.

For example, prior to processing the scene memory data in response to the current observation, for each prior observation, the system can transform pose data in the prior observation to be in a coordinate system defined by the current pose data and then generate the embedding of the prior representation using the transformed pose data instead of the original data. In these cases, the system can store the pose data for each observation and the initial embeddings of the other data in the observation, requiring only minimal additional computation at each time step, i.e., only the computation required to generate the initial embedding of the transformed pose and then generate the final embedding from the initial embedding. In other words, the system can still discard the high-dimensional data like images and maintain only a relatively lower-dimension embedding of the high-dimensional data.

In some implementations, each embedding in the scene memory data also embeds temporal information for the corresponding observation, i.e., by adding data identifying the time step at which the observation was received to one of the data modalities in the observation before that modality is embedded.

The system processes the scene memory data 128 using the encoder neural network 112 to generate the encoded representation.

As described above, the encoder neural network 112 applies an encoder self-attention mechanism to the scene memory data 128 to generate the encoded representation of the scene memory data 128.

More specifically, in some implementations, the encoder neural network 112 includes an encoder attention block that maps the embeddings in the scene memory data to a set of queries, a set of keys, and a set of values.

The encoder attention block then applies an attention function that computes a weighted sum of each of the values, where the weights are based on dot-product similarity or another similarity measure between the queries and the keys. The attention block can then apply one or more other operations, e.g., residual connections, layer normalization operations, fully-connected layers, or some combination of the above, to generate the final output of the attention.

Generally, the final output of the attention block includes a set of updated values, which, in this case, is an updated embedding of each of the observations in the scene memory data.

More details about attention blocks and operations that may be performed by an attention block to generate the final output of the attention block after applying an attention mechanism are described in A. Vaswani, N. Shazeer, N. Parmar, J. Uszkoreit, L. Jones, A. N. Gomez, L. Kaiser, and I. Polosukhin. Attention is all you need. In Advances in Neural Information Processing Systems, 2017, the entire contents of which are hereby incorporated by reference herein in their entirety (attention blocks are referred to in this reference as "layers").

By applying this attention block to the scene memory data, the embeddings in the scene memory are updated based on their context. That is, the encoder neural network transforms the original embeddings, which are generated based only on data in the corresponding observation, to context-aware embeddings that encode relationships between the different observations that have been previously received. In this manner, the encoder can extract spatio-temporal dependencies from the embeddings in the memory and can update the embeddings to reflect those dependencies.

When the number of observations in the scene memory data is large, the computational complexity of the encoder block can also be large. In particular, the computational complexity of an attention mechanism as described above is dominated by the number of query-key pairs whose similarities need to be evaluated. In some implementations, the system applies a memory factorization technique to reduce the computational complexity of the encoder neural network.

In particular, instead of including the encoder attention block described above, the encoder neural network 112 instead includes two attention blocks and the scene memory data includes (i) embeddings and (ii) a compressed representation of the embeddings. The compressed representation generally includes many fewer embeddings than the total number of prior observations.

In particular, the compressed representation includes a plurality, i.e., a fixed number, of center embeddings. Each center embedding is the center of a respective cluster of embeddings of the prior observations. The system can cluster the embeddings in the scene memory data and identify the centers of those clusters using any of a variety of existing clustering techniques. For example, the system can apply iterative farther point sampling on the embeddings to determine the centers.

In these implementations, when the system updates the scene memory to include the current embedding of the current observation, the system also updates the compressed representation to account for the current observation in the clustering.

Because the number of embeddings in the compressed representation is fixed, the compressed representation can be used to reduce the computational complexity of the attention mechanism as described below even when the number of embeddings in the scene memory grows very large.

In particular, when the scene memory data includes the compressed representation, the encoder includes two attention blocks.

The first attention block processes (i) the embeddings in the scene memory and (ii) the compressed representation of the embeddings to generate a first encoder block output. In other words, the first attention block generates a set of queries form the compressed representation and then the set of keys and values from the embeddings. Because the compressed representation includes fewer embeddings, the number of key-value pairs that are evaluated by this first attention block is much smaller than the number that need to be evaluated by the above encoder attention block.

The second attention block processes (i) the embeddings in the scene memory and (ii) the first encoder block output to generate the encoded representation of the scene memory data. In other words, the second attention block generates a set of queries from the embeddings and then the set of keys and values from the first encoder block output.

By dividing the computation in this manner, the system can leverage the fixed size of the compressed representation to reduce the computational complexity of the encoder neural network.

Once the encoder neural network has generated the encoded representation, the decoder neural network 114 uses the encoded representation and the embedding of the current observation to generate the action selection output.

In particular, the decoder neural network 114 includes a decoder attention block that is configured to generate a decoder query from the embedding of the current observation, generate decoder values from the encoded representation of the scene memory data, generate decoder keys from the encoded representation of the scene memory data; and apply a decoder attention mechanism that uses the decoder query as a query input, the decoder values as a value input, and the decoder keys as a key input to generate a decoder attention output.

In other words, the decoder attention block operates as described above with respect to the encoded attention block, except that the query is generated from the embedding of the current observation and the keys and values are generated from the encoded representation.

In some implementations, the encoder attention block (or blocks, when the memory factorization is used), the decoder attention block, or both apply an attention mechanism that uses multiple attention heads. When multiple attention heads are used, each attention head independently performs the operations of the attention mechanism, i.e., independently generates the queries, keys, and values from the respective appropriate sources and then applies the attention mechanism to the queries, keys, and values. The outputs of the attention heads are combined, e.g., concatenated, to generate the final output of the attention mechanism.

The decoder neural network 114 also includes one or more output layers that map the decoder attention output to the action selection output 122. For example, the output layers can include one or more fully-connected layers and then one or more final output layers that generate an output of the appropriate size, e.g., a probability or a Q value for each action, parameters of a probability distribution, or an action vector.

Figure 3:
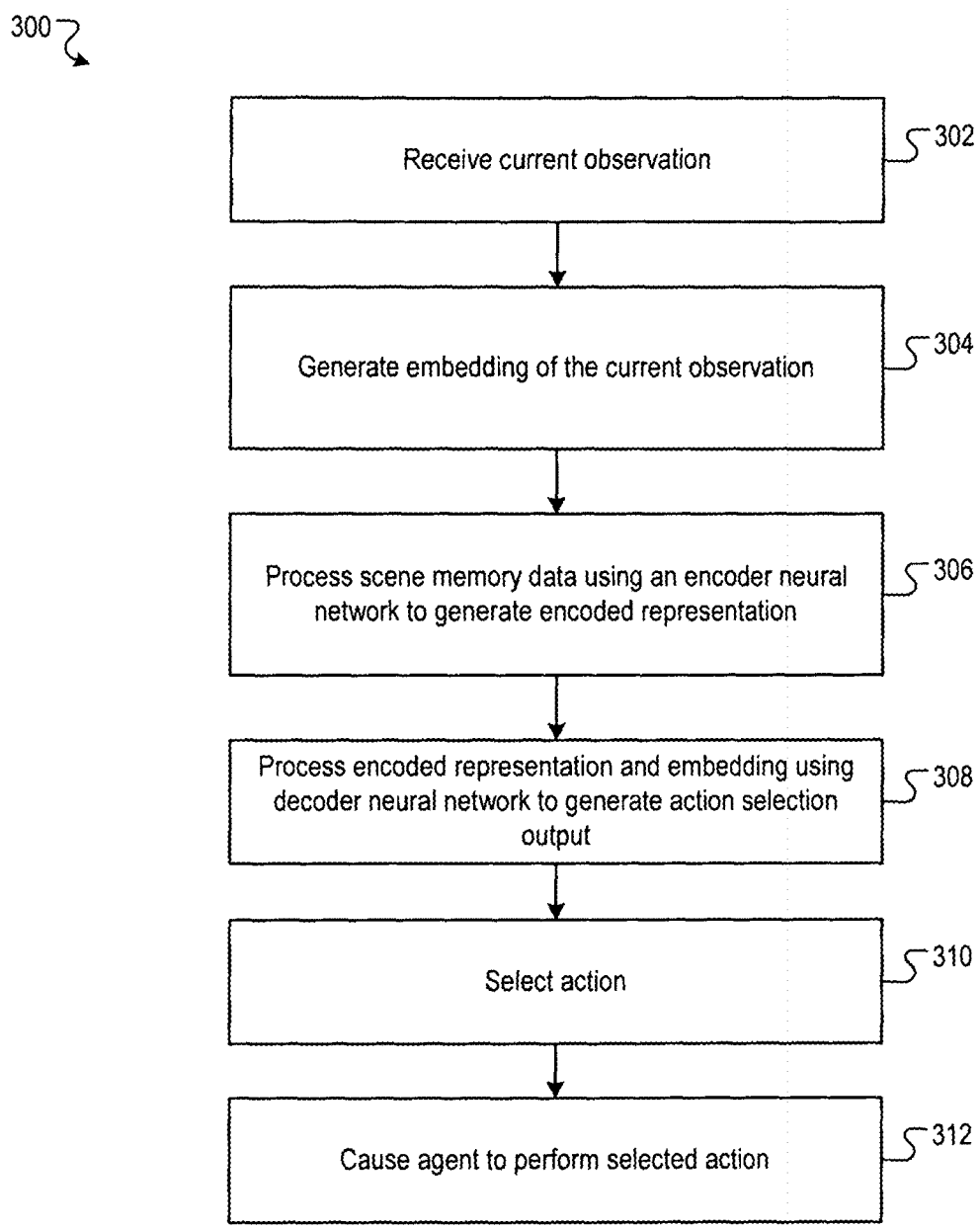
FIG. 3 is a flow diagram of an example process for controlling the agent at the current time step.

FIG. 3 is a flow diagram of an example process 300 for controlling the agent at a given time step. For convenience, the process 300 will be described as being performed by a system of one or more computers located in one or more locations. For example, a control system, e.g., the control system 100 of FIG. 1, appropriately programmed, can perform the process 300.

The system receives a current observation characterizing the current state of the environment (step 302).

The system generates an embedding of the current observation (step 304), e.g., by processing the observation using an embedding neural network.

The system processes the scene memory data using an encoder neural network to generate an encoded representation of the scene memory data (step 306). As described above, the scene memory data includes embeddings of prior observations received at prior time steps and, optionally, the embedding of the current observation, i.e., in some cases the scene memory data does not include the embedding of the current observation.

The system processes the encoded representation of the scene memory data and the embedding of the current observation using a decoder neural network to generate an action selection output (step 308).

The system selects, based on the action selection output and in accordance with a control policy for the agent, an action from a set of possible actions to be performed by the agent in response to the current observation (step 310) and causes the agent to perform the selected action (step 312).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers.

The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of controlling an agent interacting with an environment, the method comprising, at each of a plurality of time steps:
   receiving a current observation characterizing a current state of the environment as of the time step;
   generating an embedding of the current observation;
   processing scene memory data comprising embeddings of prior observations received at prior time steps using an encoder neural network, wherein the encoder neural network is configured to apply an encoder self-attention mechanism to the scene memory data to generate an encoded representation of the scene memory data;
   processing the encoded representation of the scene memory data and the embedding of the current observation using a decoder neural network to generate an action selection output, wherein the decoder neural network comprises a decoder attention block that is configured to, for each of one or more attention heads:

generate a decoder query from the embedding of the current observation;

generate decoder values from the encoded representation of the scene memory data;

generate decoder keys from the encoded representation of the scene memory data; and apply a decoder attention mechanism that uses the decoder query as a query input, the decoder values as a value input, and the decoder keys as a key input to generate a decoder attention output;

selecting, based on the action selection output and in accordance with a control policy for the agent, an action from a set of possible actions to be performed by the agent in response to the current observation; and causing the agent to perform the selected action.

2. The method of claim 1, further comprising, at each of a plurality of time steps:

generating updated scene memory data that comprises (i) the embeddings of the plurality of prior observations and (ii) the embedding of the current observation.

3. The method of claim 1, wherein the scene memory data comprises (i) embeddings and (ii) a compressed representation of the embeddings.

4. The method of claim 3, wherein the encoder neural network comprises a first encoder attention block that processes (i) the embeddings in the scene memory data and (ii) the compressed representation of the embeddings to generate a first encoder block output.

5. The method of claim 4, wherein the encoder neural network comprises a second encoder attention block that processes (i) the embeddings in the scene memory data and (ii) the first encoder block output to generate the encoded representation of the scene memory data.

6. The method of claim 3, wherein the compressed representation comprises a plurality of center embeddings, wherein each center embedding is a center of a respective cluster of the embeddings in the scene memory data.

7. The method of claim 6, wherein generating updated scene memory data comprises:

clustering (i) the embeddings of the prior observations and (ii) a compressed representation of the embeddings of the prior observations into a plurality of clusters; and generating a new compressed representation that includes a respective center embedding for each of the plurality of clusters.

8. The method of claim 1, wherein the scene memory data does not include the embedding of the current observation.

9. The method of claim 1, wherein the current observation comprises visual data generated from data captured by a camera sensor of the agent.

10. The method of claim 1, wherein the current observation comprises poses data that estimates a current pose of the agent.

11. The method of claim 1, further comprising:

prior to processing the scene memory data:

for each prior observation, transforming pose data in the prior observation to be in a coordinate system defined by the current pose data; and generating the embedding of the prior representation using the transformed pose data.

12. The method of claim 1, wherein the current observation comprises data identifying the previous action taken at the preceding time step.

13. The method of claim 1, wherein the current observation comprises data from a plurality of modalities, and wherein generating the embedding of the current observation comprises processing the data of each modality using one or more neural network layers corresponding to the modality.

14. The method of claim 1, further comprising:

receiving a reward in response to the agent performing the selected action;

receiving a next observation characterizing a next state of the environment after the agent performs the selected action; and using the reward and the next observation to train the decoder neural network and the encoder neural network using a reinforcement learning technique.

15. One or more non-transitory computer-readable storage media storing instructions that when executed by one or more computers cause the one or more computers to perform operations of controlling an agent interacting with an environment, the operations comprising, at each of a plurality of time steps:

receiving a current observation characterizing a current state of the environment as of the time step;

generating an embedding of the current observation;

processing scene memory data comprising embeddings of prior observations received at prior time steps using an encoder neural network, wherein the encoder neural network is configured to apply an encoder self-attention mechanism to the scene memory data to generate an encoded representation of the scene memory data;

processing the encoded representation of the scene memory data and the embedding of the current observation using a decoder neural network to generate an action selection output, wherein the decoder neural network comprises a decoder attention block that is configured to, for each of one or more attention heads:

generate a decoder query from the embedding of the current observation;

generate decoder values from the encoded representation of the scene memory data;

generate decoder keys from the encoded representation of the scene memory data; and apply a decoder attention mechanism that uses the decoder query as a query input, the decoder values as a value input, and the decoder keys as a key input to generate a decoder attention output;

selecting, based on the action selection output and in accordance with a control policy for the agent, an action from a set of possible actions to be performed by the agent in response to the current observation; and causing the agent to perform the selected action.

16. A system comprising one or more computers and one or more storage devices storing instructions that when executed by the one or more computers cause the one or more computers to perform operations of controlling an agent interacting with an environment, the operations comprising, at each of a plurality of time steps:

receiving a current observation characterizing a current state of the environment as of the time step;

generating an embedding of the current observation;

processing scene memory data comprising embeddings of prior observations received at prior time steps using an encoder neural network, wherein the encoder neural network is configured to apply an encoder self-attention mechanism to the scene memory data to generate an encoded representation of the scene memory data;

processing the encoded representation of the scene memory data and the embedding of the current observation using a decoder neural network to generate an action selection output, wherein the decoder neural network comprises a decoder attention block that is configured to, for each of one or more attention heads:
  generate a decoder query from the embedding of the current observation;
  generate decoder values from the encoded representation of the scene memory data;
  generate decoder keys from the encoded representation of the scene memory data; and
  apply a decoder attention mechanism that uses the decoder query as a query input, the decoder values as a value input, and the decoder keys as a key input to generate a decoder attention output;
selecting, based on the action selection output and in accordance with a control policy for the agent, an action from a set of possible actions to be performed by the agent in response to the current observation; and
causing the agent to perform the selected action.

17. The system of claim 16, the operations further comprising, at each of a plurality of time steps:
  generating updated scene memory data that comprises (i) the embeddings of the plurality of prior observations and (ii) the embedding of the current observation.

18. The system of claim 16, wherein the scene memory data comprises (i) embeddings and (ii) a compressed representation of the embeddings.

19. The system of claim 18, wherein the encoder neural network comprises a first encoder attention block that processes (i) the embeddings in the scene memory data and (ii) the compressed representation of the embeddings to generate a first encoder block output.

20. The system of claim 19, wherein the encoder neural network comprises a second encoder attention block that processes (i) the embeddings in the scene memory data and (ii) the first encoder block output to generate the encoded representation of the scene memory data.

* * * * *